INVENTOR
Henry W. Stier

United States Patent Office 3,456,315
Patented July 22, 1969

3,456,315
CUTTING TOOLS
Henry W. Stier, 8134 Lochdale, Dearborn
Heights, Mich. 48127
Filed Aug. 15, 1968, Ser. No. 752,810
Int. Cl. B23b 27/00
U.S. Cl. 29—96                10 Claims

ABSTRACT OF THE DISCLOSURE

Cutting tools having a support member provided with a recess adapted to removably receive a cutting bit and means for holding the cutting bit in such recess comprising essentially a filament made of a length of thread or wire having a projecting portion on one end wedged between a surface of the cutting bit and a fixed portion dependent from the support member. The free end of the filament is held by a fastener which exerts a pull on the filament holding the cutting bit in position in the recess.

Background of the invention

The invention belongs to the field of cutting tools comprising in combination a support member or holder and a removable cutting insert or cutting bit supported in a recess disposed on one end of the support member or holder.

Cutting tools, as heretofore disclosed in the prior art, include appropriate means for holding the cutting bit in position in a recess or pocket in the support member or holder, such cutting bit, made of an ultra hard material such as a cemented carbide or the like, being also generally of the indexable and throw-away type. The means provided for holding the cutting bit in position in the support member or holder include clamping means, set screws, holding bolts, eccentric pins and like arrangements, which are designed to hold the cutting bit in the tool holder with the lower face of the cutting bit firmly applied to the bottom surface of the recess or pocket in the holder or, alternately in constructions where an anvil or shim is disposed between the bottom surface or pocket and the cutting bit, to firmly apply the bottom face of the cutting bit to the upper surface of such anvil or shim. Additionally, the holding or clamping means for removable cutting bits disposed in a pocket or recess in a support member or holder are often designed so as to firmly apply at least one side surface of the cutting bit with a side wall of the recess or pocket. As a result, such holding or clamping means often consist of many independent parts cooperating with each other, are costly to manufacture, are subject to breakage and failure, and ordinarily do not permit adjustment of the intensity and direction of the clamping forces.

Summary of the invention

The present invention provides a structure permitting to clamp and hold a cutting bit in an appropriate recess or pocket in a support member or holder with a minimum amount of cooperating elements, with no obstruction or interfering parts projecting from the cutting bit or from the support member, effectively clamping the cutting bit in the receiving recess or pocket while permitting to adjust the force of clamping and, to a certain degree, the orientation of the direction of lateral clamping force of the cutting bit relative to one or more side walls of the recess. This is accomplished by the present invention by providing as a clamping and holding means a conformable substantially thin elongated member in the form of a filament made of a textile thread or metallic wire, having on one end an enlarged portion engaging a surface of the cutting bit by wedging engagement therewith. The free end of the elongated thin member or filament is removably attached to a fastening member permitting to exert or pull on the filament that causes the cutting bit to be securely anchored in the recess in the support member.

The many objects and advantages of the invention will become apparent to those skilled in the art when the following description of a few examples of practical embodiments of my invention is read in conjunction with the accompanying drawings. The examples of my invention hereinafter described in detail are given for illustrative purpose only, and not in any restrictive manner whatsoever, for the purpose of explaining the principle of my invention.

Detailed description of the preferred embodiments

Figure 1:
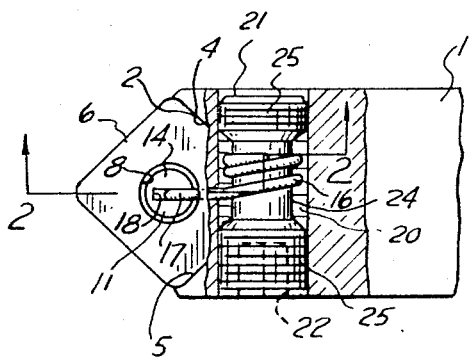
FIG. 1 is a top plan view of an example of a cutting tool according to my invention, with portions broken away to show the internal construction.
Figure 3:
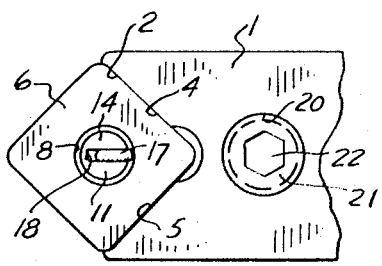
FIG. 3 is a top plan view of a modification of the embodiment of FIGS. 1–2.

Referring now generally to FIG. 1 through FIG. 4, my present invention includes a support member or holder 1, for mounting on a machine lathe or the like, provided on one end with a recess 2 forming a bottom surface 3 and a pair of side walls 4 and 5. A cutting insert or bit 6, which, in the example shown is a square shape cutting insert or bit, is disposed in the recess 2 with a pair of lateral faces of the cutting bit engaging with the side walls 4 and 5 of the recess. An anvil or shim 7, having a shape generally conforming to the shape of the cutting bit 6, is placed between the bottom or supporting surface 3 of the recess and the bottom face of the cutting bit. The cutting bit is provided with a centrally disposed mounting aperture 8, the shim 7 being similarly provided with a mounting aperture 9. The support member 1 has a bore 10 generally normal to the bottom surface 3 of the recess 2 and having its axis generally aligned with the axes of the mounting apertures 8 and 9 of respectively the cutting bit 6 and the shim 7. A cylindrical pin 11 is passed through the aligned apertures 8 and 9 and has a lower portion engaging the bore 10 in a press fit manner. The pin has an enlarged shoulder portion 12, best seen in FIG. 2, which in the example shown is tapered or frustoconical and which is disposed in engagement with a countersink 13 forming an enlarged diameter portion of the aperture 9 in the shim 7 disposed toward the bottom face of the cutting bit. Alternately, the enlarged diameter portion of the aperture 9 may be shaped as an annular recess adapted to be engaged by an annular shoulder portion (not shown), of the pin 11. In this manner, the shim 7 is held securely in position when the pin 11 is forced into the bore 10 in the support member.

Figure 2:
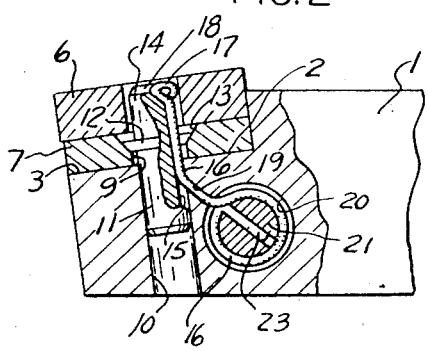
FIG. 2 is a sectional view substantially along line 2—2 of FIG. 1.
Figure 4:
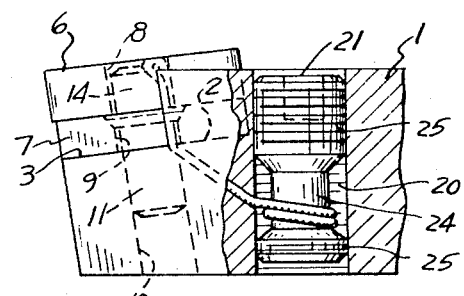
FIG. 4 is a side elevation view of the modification of FIG. 3 with portions broken away to show the internal construction.

The upper end 14 of the pin 11 is loosely disposed within the mounting aperture 8 in the cutting bit 6 and the pin is provided with a longitudinal slot or groove 15, best seen in FIG. 2 in which is passed an elongated slender filament 16 having an enlarged portion on one end thereof, as shown at 17, which is disposed in an enlarged portion 18 of the groove 15 in the pin. The filament 16 may be a metallic wire such as steel wire commonly known as "piano wire" with the enlarged portion 17 on one end thereof formed by a bent-over portion of the wire end forming a tightly closed loop which, if so desired, may be welded or soldered upon itself. Alternately, the enlarged portion on the end of the filament may consist of a large diameter elongated tapered washer welded or soldered on the end of the wire. The filament 16 may also be made of a textile thread such as a nylon wire or the like, with the enlarged end portion thereof being made of a bent-over loop glued or cemented onto itself or a reinforced knot or the like. The filament 16 needs not be made of solid material but may be made of stranded material, either metallic or textile.

The other end of the filament 16 passes through an inclined passageway 19 disposed in the support member 1 and placing in communication the bore 10 therein and a generally cylindrical recess 20 formed in the support member 1. In the embodiments of FIGS. 1–2 the cylindrical recess 20 is laterally oriented while in the embodiments of FIGS. 3–4 the cylindrical recess 20 is vertically oriented as seen in the drawings. It is therefore obvious that the orientation of the cylindrical recess 20 is immaterial and is only dictated by considerations of easy access to an end of a male cylindrical member 21 disposed in the cylindrical recess 20. The male cylindrical member 21 has at least one end provided with a socket, as shown at 22 in FIG. 3, for introduction therein of the end of a wrench permitting to rotate the cylindrical member 21 so as to exert a pull on the other end of the filament 16 engaged in a generally diametrically disposed aperture or bore 23 in the body of the cylindrical member. A portion of the filament 16 is wound around a reduced diameter portion 24 of the cylindrical member 21, and, preferably, the peripheral surface of the body, as shown at 25, has a thread engaging a corresponding thread on the inner surface of the cylindrical recess 20. The cutting bit 6 is thusly held firmly in position in the recess 2 by exerting a pull on one end of the filament 16 by rotating the cylindrical member 21 by means of an appropriate wrench. The enlarged end portion 17 of the filament becomes wedged between the inclined enlarged portion 18 of the slot in the pin 14 and the surface of the aperture 8 in the cutting bit 6. The frictional engagement between the thread of the cylindrical recess 20 and the thread on the peripheral surface of the cylindrical member 21 maintains the tension or pull on the filament 16 until the cylindrical member 21 is rotated in an opposite direction releasing such pull and at the same time releasing the wedging action of the enlarged end portion 17 on the filament, thus permitting the cutting bit to be removed for indexing of a fresh cutting point or for replacement by a new cutting bit.

It is to be appreciated that the wedging force and the pull exerted on the cutting bit 6 is such that the clamping force is directed downwardly, as seen in the drawing, thus firmly applying the bottom surface of the cutting bit against the upper surface of the anvil or shim 7. At the same time, a force is directed, as a result of the inclination of the enlarged portion 18 of the slot in the pin 14, is a generally rearward direction, as seen in the drawings, thus urging the side faces of the cutting bit 6 in firm engagement with the side walls 4 and 5 of the recess 2. By proper angular orientation of the pin 14, the enlarged portion 18 of the slot therein which, in the drawings, is shown aligned substantially with the longitudinal axis of the cutting tool, may be oriented in any direction such that the reactive force applying the side faces of the cutting bit against the side walls of the recess may be prominent in a predetermined direction so as to apply the cutting bit with a greater force against one side wall than against the other.

The original assembly of the cutting tool of the invention is evident from the preceding description of the examples thereof illustrated in FIGS. 1–4. The filament 16 is passed through the inclined passageway 19 with the cylindrical member 21 longitudinally and angularly positioned such that the generally diametrical bore or aperture 23 therethrough registers with the outlet of passage 19 within the cylindrical recess 20. Once the end of the filament 16 is engaged in such aperture 23, the pin 11 is inserted in the bore 10 until its enlarged portion 12 engages the enlarged diameter portion 13 of the shim 7. The insert 6 is then placed on top of the shim 7 and the cylindrical member 21 is rotated until the filament 16 is pulled in and a constant pulling force is exerted thereon as a result of the cylindrical member being angularly rotated and locked in an appropriate angular position.

It is obvious that in tools having the cutting bit disposed directly on the bottom surface of the recess without an anvil or shim interposed between each recess surface and the bottom force of the cutting bit, the hereinbefore described structure remains the same with the shim 7 being omitted.

Figure 5:
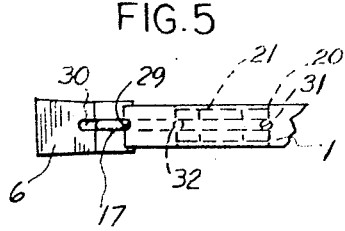
FIG. 5 is a top plan view of an example of cut off of grooving tool according to a further modification of my invention.
Figure 6:
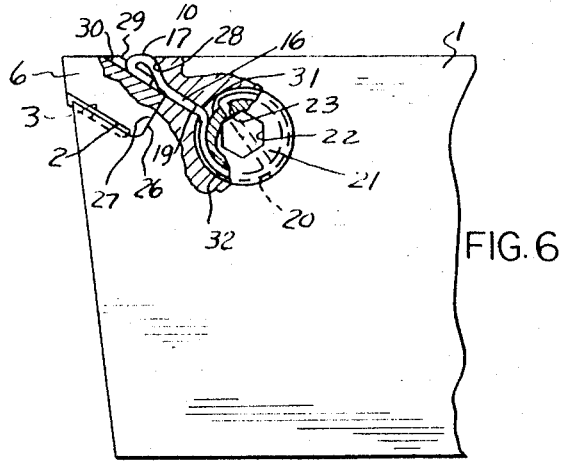
FIG. 6 is a side elevation view of the tool of FIG. 5 with portions broken away to show the internal construction.

Referring now to FIGS. 5–6, there is illustrated a modification of the invention for application to a cut-off or grooving tool. The modification of FIGS. 5–6 include a holder or support member 1 provided with a cut out portion forming a recess 2 opened on both sides of the support member 1. The recess 2 has an inclined bottom surface 3, which, in the example shown, is preferably concave or V-shaped and which is adapted to support the cutting bit 6 having a rear face 26 engaging a rear wall 27 of the recess 2. The rear wall 27 of the recess is provided with a converging inclined portion 28 having a groove 29, best seen in FIG. 5, engageable by the enlarged looped-over end portion 17 of a filament 16. The cutting insert or bit 6 has a face 29 preferably provided with a groove 30, such that when the filament 16, is pulled by way of a cylindrical member 21 disposed in a cylindrical recess 20 in the support member 1 when rotated, the end of the filament 16 being engaged in a diametral aperture 23 in the cylindrical member 21, the filament is partly wound around the cylindrical body 21 in a space formed between an annular groove 31 formed on the periphery of the cylindrical member and a corresponding annular groove 32 in the cylindrical recess 20, the filament 16 being threaded through a passageway 19 having an outlet disposed within the cylindrical recess 20.

In the embodiment of FIGS. 5–6, in view of the limited thickness of the holder or support member 1, it is not possible to provide the cylindrical member 21 and the cylindrical recess with engaging threads and only the frictional engagement of the peripheral surface of the cylindrical member 21 with the iner surface of the cylindrical recess 20 causes the pull exerted on the end of the filament 16 to be maintained so as to properly hold the cutting bit 6 in the recess 2 as a result of the wedging action of the enlarged portion 17. The frictional engagement of the surfaces may be improved by close fit between the cylindrical member and the cylindrical recess and/or by special treatment and roughening of the surfaces in engagement.

Having thus described my invention by way of examples of practical applications thereof given for illustrative purpose only, modifications whereof will be apparent to those skilled in the art, what I desire to protect by United States Letters Patent is as follows:

1. A cutting tool arrangement comprising in combination a support member, a recess disposed on one end of the support member adapted to removably receive a cutting bit, a cutting bit disposed in the recess with a portion thereof exposed for cutting engagement with a workpiece, and means for holding the cutting bit in the recess characterized by a filament, a projecting portion on one end of the filament, means dependent from the cutting bit and adapted to wedge the projecting portion on one end of the filament in engagement with a surface of the cutting bit, means for exerting a pull on the other end of the filament in a general direction holding the cutting bit in the recess, and means for maintaining the pull on the other end of the filament.

2. The arrangement of claim 1 in which the means for exerting a pull on the other end of the filament comprises a generally cylindrical clamping member disposed in a cylindrical recess in the support member, a passageway in the support member leading into the cylindrical recess for accepting the filament therethrough, a radial bore in the cylindrical member adapted to receive the other end of the filament and means for rotating the cylindrical member for winding part of the filament therearound, a portion of the periphery of the cylindrical member frictionally engaging a portion of the inner surface of the cylindrical recess.

3. The arrangement of claim 1 in which the projecting portion of one end of the filament is formed by such end being bent over in a tight loop.

4. The arrangement of claim 1 further comprising a mounting aperture in the cutting bit, the first mentioned end of the filament being disposed through the mountnig aperture with the projecting portion thereof disposed relatively to the aperture so as to clamp the cutting bit in the recess.

5. The arrangement of claim 4 further comprising an aperture in the bottom of the recess aligned with the aperture in the cutting bit, a pin engaged in the aligned apertures, a lateral longitudinal groove in the pin for receiving the filament and an enlarged portion in the groove for receiving the projecting portion on the end of the filament for clamping engagement between the pin and a portion of the surface of the mounting aperture in the cutting bit.

6. The arrangement of claim 4 further comprising a shim disposed below the cutting bit in the recess.

7. The arrangement of claim 6 further comprising an aperture in the shim aligned with the amounting aperture in the cutting bit, an enlarged diameter portion in the shim aperture disposed toward the cutting bit, an aperture in the bottom of the recess aligned with the aperures in the cutting bit and the shim, a pin engaged in the aligned apertures, a shoulder portion on the pin engaging the enlarged diameter portion of the shim, a lateral longitudinal groove in the pin for receiving the filament and an enlarged portion in the groove for receiving the projecting portion on the end of the filament for clamping engagement between the pin and a portion of the surface of the mounting aperture in the cutting bit.

8. The arrangement of claim 1 in which the projecting portion of the end of the filament in wedged between an exterior surface of the cutting bit and a side wall of the recess.

9. The arrangement of claim 1 in which the pull exerted on the other end of the filament holds the cutting bit in engagement with a bottom surface of the recess and at least one side wall of the recess.

10. The arrangement of claim 5 in which the pull exerted on the other end of the filament holds the cutting bit in engagement with the shim and at least one side wall of the recess.

References Cited

UNITED STATES PATENTS

| | | | |
|---|---|---|---|
| 2,240,404 | 4/1941 | King | 29—96 X |
| 3,146,656 | 9/1964 | Richards | 29—96 X |
| 3,154,974 | 11/1964 | Greenleaf | 29—96 X |
| 3,226,797 | 1/1966 | Hertel | 29—96 |
| 3,289,272 | 12/1966 | Stier | 29—96 |
| 3,354,526 | 11/1967 | Erkfritz | 29—96 |

HARRISON L. HINSON, Primary Examiner